(12) United States Patent
Grenzi (10) Patent No.: US 10,597,099 B2
(45) Date of Patent: Mar. 24, 2020

(54) DRIVE SPROCKET FOR THE RUBBER BELT OF A TRACK-TYPE VEHICLE

(71) Applicant: BERCO S.P.A., Copparo (IT)

(72) Inventor: Francesco Grenzi, Ferrara (IT)

(73) Assignee: BERCO S.P.A., Copparo (Fe) (IT)

( * ) Notice: Subject to any disclaimer, the term of this patent is extended or adjusted under 35 U.S.C. 154(b) by 75 days.

(21) Appl. No.: 15/778,756

(22) PCT Filed: Nov. 30, 2016

(86) PCT No.: PCT/IB2016/057213
§ 371 (c)(1),
(2) Date: May 24, 2018

(87) PCT Pub. No.: WO2017/093908
PCT Pub. Date: Jun. 8, 2017

(65) Prior Publication Data
US 2018/0346040 A1    Dec. 6, 2018

(30) Foreign Application Priority Data

Dec. 1, 2015 (IT) .................. 102015000078875

(51) Int. Cl.
*B62D 55/24* (2006.01)
*B62D 55/12* (2006.01)
*B62D 55/14* (2006.01)

(52) U.S. Cl.
CPC ........... *B62D 55/244* (2013.01); *B62D 55/12* (2013.01); *B62D 55/14* (2013.01)

(58) Field of Classification Search
CPC ....... B62D 55/244; B62D 55/12; B62D 55/14
See application file for complete search history.

(56) References Cited

U.S. PATENT DOCUMENTS

| 2,338,818 A | 1/1944 | Mayne |
| 3,451,728 A | 6/1969 | Bruneau |

(Continued)

FOREIGN PATENT DOCUMENTS

| EP | 0 006 301 A1 | 1/1980 |
| JP | 2002-2562 A | 1/2002 |
| JP | 2012-126399 A | 7/2012 |

OTHER PUBLICATIONS

International Search Report (PCT/ISA/210) issued in PCT/IB2016/057213, dated Mar. 30, 2017.

(Continued)

*Primary Examiner* — Kip T Kotter
(74) *Attorney, Agent, or Firm* — Birch, Stewart, Kolasch & Birch, LLP (57) ABSTRACT

An undercarriage assembly for a track-type vehicle is described. The assembly comprises at least one closed-ring rubber belt, internally provided with a continuous insert made of a plurality of metal elements embedded in the rubber mass that constitutes the rubber belt. The metal elements are positioned at a fixed and predetermined distance apart from one another, which determines the pitch of the rubber belt. The rubber belt further encloses therein one or more reinforcing elements, each consisting of a metal wire bundle oriented according to an axis substantially parallel to the longitudinal development central axis of the rubber belt. The assembly also comprises a plurality of rolling elements of each rubber belt, consisting of at least one drive sprocket, configured to mesh with the metal elements of the continuous insert and to rotationally move the respective rubber belt, of at least one idler wheel and of a plurality of rollers. Each drive sprocket consists of a gear integral with at least one disk arranged on a plane parallel to the development plane of the gear. An annular groove is interposed between the gear and each disk and each disk is (Continued)

provided with a smooth circumferential surface that engages with a predefined portion of the inner surface of the rubber belt, so as to absorb one part of the contacting forces that are generated between the rubber belt and the entire plurality of rolling elements of the rubber belt.

14 Claims, 5 Drawing Sheets

(56) References Cited

U.S. PATENT DOCUMENTS

| | | | | |
|---|---|---|---|---|
| 5,131,731 A | * | 7/1992 | Johnson | B62D 55/125 |
| | | | | 305/193 |
| 5,161,866 A | | 11/1992 | Johnson | |
| 5,161,867 A | | 11/1992 | Johnson | |
| 2004/0061378 A1 | * | 4/2004 | Girard | B62D 55/125 |
| | | | | 305/199 |
| 2012/0228926 A1 | * | 9/2012 | Bair | B62D 55/14 |
| | | | | 305/136 |
| 2018/0022407 A1 | * | 1/2018 | Lussier | B62D 55/084 |
| | | | | 180/9.1 |

OTHER PUBLICATIONS

Written Opinion (PCT/ISA/237) issued in PCT/IB2016/057213, dated Mar. 30, 2017.
Japanese Office Action, dated Aug. 20, 2019, for Japanese Application No. 2018-527220, with an English translation.

* cited by examiner

DRIVE SPROCKET FOR THE RUBBER BELT OF A TRACK-TYPE VEHICLE

The present invention refers in general to an undercarriage assembly for a track-type vehicle and, in particular, to a drive sprocket for the rubber belt of a track-type vehicle provided with integrated idler wheel.

A conventional undercarriage assembly, also called "track", of a track-type work vehicle generally comprises a pair of parallel metal chains, each made through a continuous sequence of articulated joints of the hinge type, connected together and kept at a constant distance apart through suitable rigid connection members, called links of the track. The track also comprises a plurality of bushings and pins, interposed between the links to connect the ends thereof so as to form the chains. The bushings and the supported links cooperate with each other to form a plurality of track joints, which allow the necessary rotation movement between adjacent links. This allows the articulation of the adjacent links when the track rotates wound on the wheels (drive and/or idler) of the track-type vehicle. The rotation of the track allows the track-type vehicle to move on the ground to carry out the multiple operations for which it is intended.

Tracked vehicles intended for moving earth include so-called "compact track loaders" or CTL. These vehicles use a pair of rubber coated bands instead of the more common metal chains. Compact track loaders appeared on the market roughly fifteen years ago and are meant to work alongside, and in some cases replace, wheeled vehicles called "skid-steer loaders" or SSL, as well as small tractors with metal tracks. Currently, the market of "compact track loaders" is mainly reserved to America and the total annual production of such vehicles approaches 40000-50000 units. "Compact track loaders" were initially designed to reach a maximum speed of about 10 km/h, but in recent times their maximum speed has increased to 15-17 km/h. These are values that are generally higher with respect to those that can be reached by vehicles with metal tracks. "Compact track loaders" are therefore increasingly common and are eroding the market share both of "skid-steer loaders", and of analogous vehicles with metal tracks.

Each rubber belt of a "compact track loader" substantially consists of three main components:
an insert made of a plurality of metal elements embedded in the rubber belt ("embedded metal"). The metal elements are positioned at a fixed and predetermined distance one to another, such a distance determining the pitch of the rubber belt;
a so-called "steel cord", in other words a metal wire wound in a loop like a sort of bundle; and
a rubber compound.

The metal insert has a structural function. In other words, the metal insert is the component that supports the loads of the vehicle and that gives stability to such a vehicle, since it is a component equipped with extreme rigidity. In its central part, the metal insert also has a specially shaped portion having the function of transmitting the motion. In this central area the metal insert indeed meshes with the drive sprocket with which it couples.

The "steel cord" is also a reinforcing element of the rubber belt and, in particular, works under traction, absorbing the longitudinal load and reduces the elastic effect due to the rubber compound. Due to this characteristic, the steel cord is the element of reference on which to base the sizing of the drive sprocket. The geometry of the drive sprocket, indeed, must be such as to match up with and take into consideration the dimensional constraints set by the two metal parts of the rubber belt (embedded metal and steel cord).

Finally, the rubber compound has the function of creating, through the geometry of its tread, the correct grip of the vehicle on the ground. The rubber compound obviously also has the function of a damping element.

The increasingly common presence on the market of compact track loaders has highlighted some critical points of these vehicles, typically consisting of a poor lifetime of the drive sprockets and of vibration and noise phenomena. Whenever the metal insert hits the front or rear idler wheel, generally of the single-flange type, a bang is indeed generated and therefore noise and vibrations.

An attempt to attenuate the noise and vibration phenomena generated by the idler wheels, front and/or rear, of each rubber belt has already been carried out by making dual-flange idler wheels replacing the more common single-flange idler wheels. Some manufacturers have thus adopted mixed solutions, in other words with dual-flange idler wheels only in the front part or in the rear part of the rubber belt, with reference to the direction of travel of the vehicle. Other manufacturers, on the other hand, have preferred to use dual-flange idler wheels both in the front part, and in the rear part of the rubber belt.

The problem of vibrations and noise generated by the idler wheels occurs in an analogous manner also for the drive sprocket. Also in the meshing between rubber belt and drive sprocket, indeed, whenever the metal insert hits the drive sprocket a bang is generated and therefore noise and vibrations. In addition, the drive sprockets, as well as the front idler wheels, typically have small rolling diameters (about 290 mm and 350 mm), for which reason the accelerations and thus the bangs are great.

A solution to this problem can consist of making drive sprockets having a greater number of teeth, so as to approach the operating conditions of the larger machines with metal chains. This solution, however, involves a modification of the overall geometry of each track.

Another problem that conventional compact track loaders suffer from consists of so-called "detracking" of the rubber belt, which consists of the rubber belt itself coming away from its rolling elements, like rollers and wheels. The rubber belt, indeed, does not possess the rigidity of a steel chain so that, if subjected to lateral loads (sharp steering and inclined slopes), it can undergo the detracking phenomenon.

In order to limit this drawback the rubber belt is strongly pretensioned, so that the meshing of the band with the front idler wheels and with the drive sprockets always takes place in the presence of a high load. However, pretensioning presents the following problems:
decrease in kinematic efficiency, since it is necessary to overcome the preload due to the pretensioning force. This therefore constitutes a dissipative effect; and
high contact forces between the rubber belt and the components of the track, in particular the front idler wheel, the rear idler wheel and the drive sprocket, which mesh with it. This aspect has the consequence of high wear and phenomena linked to noise and vibrations. In "compact track loaders", in particular, the smaller size of the vehicle and the triangular arrangement of the "high drive" type of the rolling elements, with the drive sprocket in raised position, reduce the winding arc and the number of teeth engaged, worsening this specific problem.

The drive wheels have up to now been devised as a simple sprocket. The pitch diameter of the drive sprocket is obviously calculated as a function of the pitch of the rubber belt and the number of teeth (Z) of the drive sprocket itself. During the meshing step the metal insert enters and takes position in the space of each tooth. The meshing portion, of rounded shape, of the metal insert sits on the bottom of the tooth and rests on the side of the tooth itself, from which it receives the drive force that allows the vehicle to move forwards.

In this type of meshing and with the functional specifications described above, the metal insert of the rubber belt undergoes an acceleration due to the winding step on the drive sprocket. Such an acceleration is of increasing magnitude as the winding diameter (pitch diameter) decreases and, therefore, as the number of teeth decreases. This kinematic aspect is added to with the contribution of the pretensioning force.

As a result, the contact between two steel elements (metal insert and drive sprocket) is obtained, since the damping effect of the rubber belt makes zero contribution. The metal insert, in the respective portion dedicated to the meshing with the drive sprocket, is indeed embedded in the rubber only for a few millimetres (1-3 mm). Such a thickness of rubber is intended to give way after a few hours of operation of the vehicle, leaving the live contact between the metal parts.

The purpose of the present invention is therefore to make an undercarriage assembly for a track-type vehicle, in particular a drive sprocket for the rubber belt of a track-type vehicle provided with integrated idler wheel, which is capable of solving the aforementioned drawbacks of the prior art in an extremely simple, cost-effective and particularly functional manner.

In detail, a purpose of the present invention is to make a drive sprocket for the rubber belt of a track-type vehicle that makes it possible to reduce the level of vibrations and of noise of the vehicle with respect to known assemblies.

Another purpose of the present invention is to make a drive sprocket for the rubber belt of a track-type vehicle that allows the degree of wear of the respective wheels to be reduced.

These and other purposes according to the present invention are accomplished by making an undercarriage assembly for a track-type vehicle, in particular a drive sprocket for the rubber belt of a track-type vehicle provided with integrated idler wheel, as outlined in claim 1.

Further characteristics of the invention are highlighted by the dependent claims, which are an integral part of the present description.

In general, in the undercarriage assembly for a track-type vehicle according to the present invention the damping effect of the rubber belt is exploited in the meshing step between the drive sprocket and the metal insert of the rubber belt. The particular drive sprocket of this assembly has indeed been designed both to exploit the damping effect of the rubber, and to reduce the forces between toothing and metal insert, at least for the part relative to pretensioning.

The characteristics and advantages of a drive sprocket for the rubber belt of a track-type vehicle according to the present invention will become clearer from the following description, given as an example and not for limiting purposes, referring to the attached schematic drawings, in which.

It should be specified that, in the attached figures and in the following description, the same reference numerals indicate elements that are the same or equivalent to one another. It should also be specified that, in the attached figures and in the following description, numerous components of the undercarriage assembly will not be mentioned and/or illustrated, since they are components that are well known to the skilled person.

With reference to the figures, an undercarriage assembly for a track-type vehicle is shown, wholly indicated with reference numeral 10. The undercarriage assembly 10 is configured to be mounted on medium-small tracked vehicles, in other words with a weight not greater than 8-10 tonnes, like for example mini-excavators, compact track loaders and also small faring tractors on a rubber belt. However, this does not rule out the possibility of mounting this specific undercarriage assembly 10 also on other heavier and larger tracked vehicles.

Figure 1:
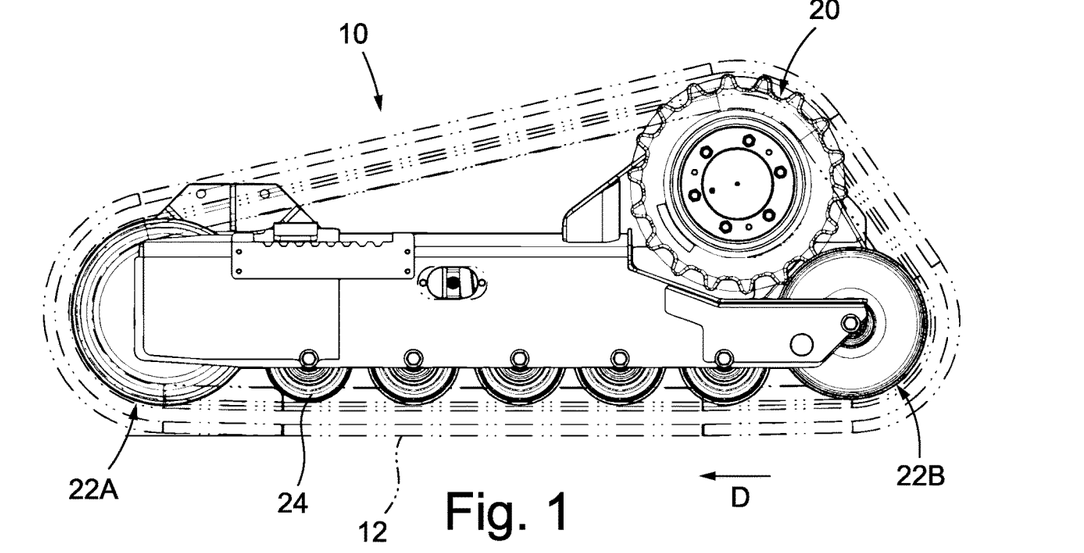
FIG. 1 is a side elevation view of an undercarriage assembly of the known type for a track-type vehicle.
Figure 2:
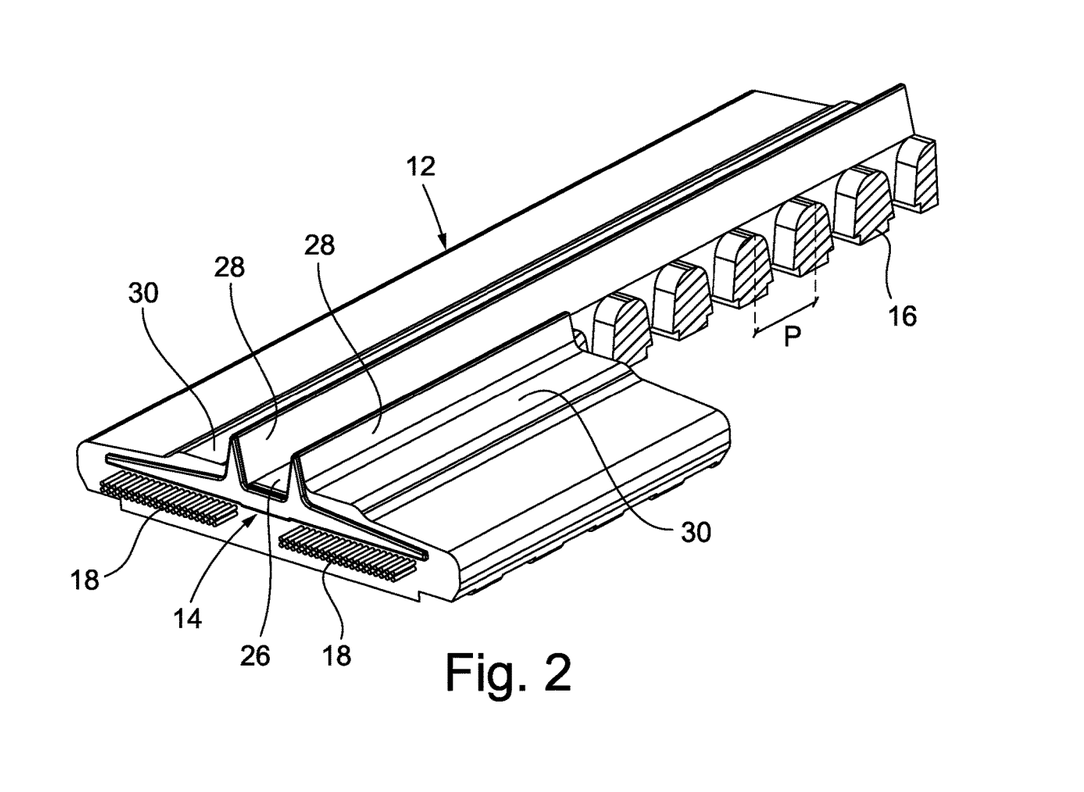
FIG. 2 is a perspective view, in partial section, of a rubber belt of an undercarriage assembly for a track-type vehicle.

The undercarriage assembly 10 comprises, typically for each side of the vehicle, at least one closed-loop rubber belt 12, internally provided with a continuous insert 14 made of a plurality of metal elements 16 embedded in the rubber mass that constitutes the rubber belt 12. The metal elements 16 are positioned at a fixed and predetermined distance apart from one another. Such a distance determines the pitch P of the rubber belt 12 (FIG. 2). The rubber belt 12 also encloses therein one or more reinforcing elements 18, each consisting of a metal wire bundle oriented according to an axis substantially parallel to the longitudinal development central axis of the rubber belt 12.

The undercarriage assembly 10 also comprises a plurality of rolling elements of each rubber belt 12, consisting of at least one drive sprocket 20, configured to mesh with the metal elements 16 of the continuous insert 14 and to rotationally move the respective rubber belt 12, of at least one idler wheel 22 and of a plurality of rollers 24. In particular, for each rubber belt 12 there are typically a front idler wheel 22A and a rear idler wheel 22B with reference to the direction of movement D of the vehicle.

Figure 4:
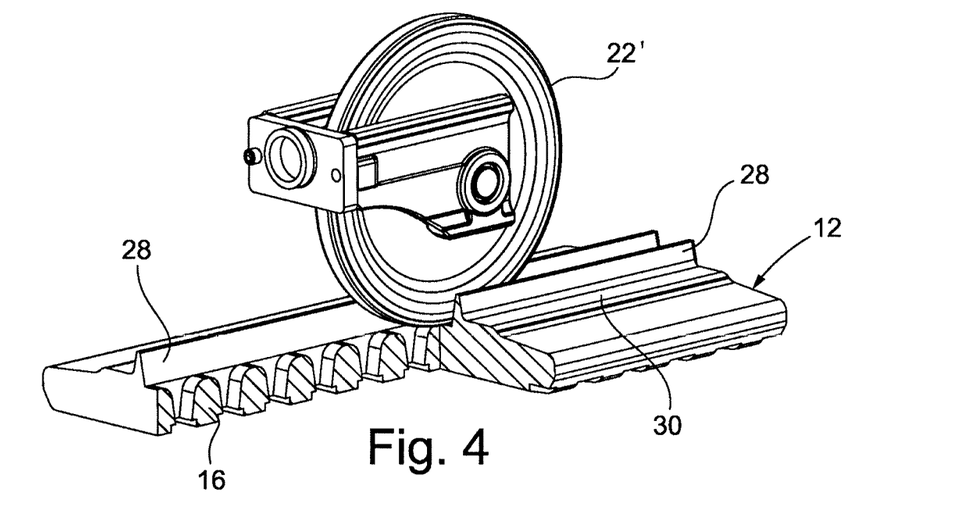
FIG. 4 is a perspective view, in partial section, of a first embodiment of an idler wheel of an undercarriage assembly for a track-type vehicle.

With reference to FIG. 4, at least one of the idler wheels 22' can be of the single-flange type, in other words consisting of a single disk configured for rotating in a longitudinal channel 26, obtained on the inner surface of each rubber belt 12 and delimited by a pair of walls 28. Inside the longitudinal channel 26 the metal elements 16 of the continuous insert 14 with which the drive sprocket 20 meshes are also obtained.

Figure 5:
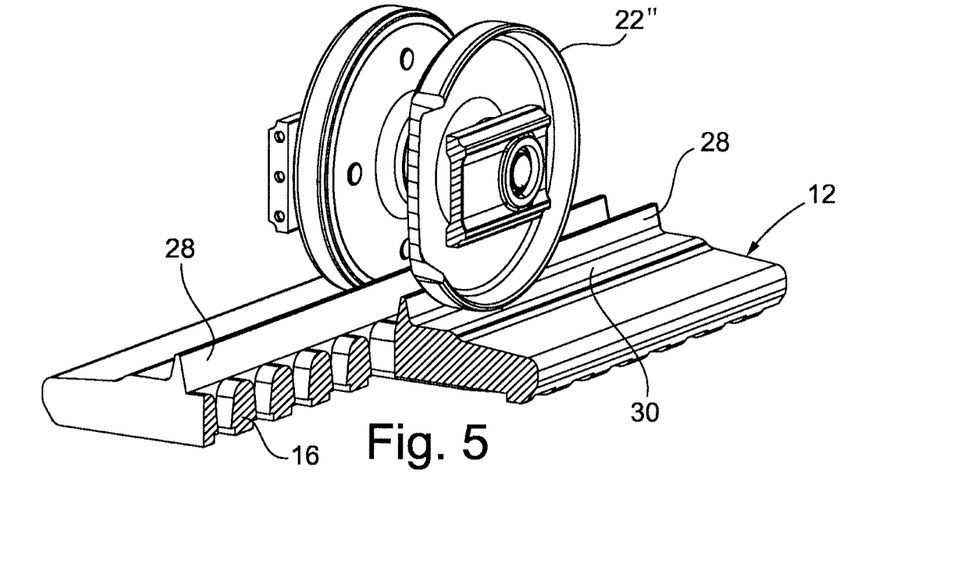
FIG. 5 is a perspective view, in partial section, of a second embodiment of an idler wheel of an undercarriage assembly for a track-type vehicle.

With reference to FIG. 5, at least one of the idler wheels 22'' can also be of the dual-flange type, in other words consisting of a pair of parallel and integral disks, between which an annular groove is interposed. Each of the two disks is configured for rotating on a respective longitudinal track 30, obtained on the inner surface of the rubber belt 12 parallel with respect to the longitudinal channel 26 and outside of the walls 28.

Figure 6:
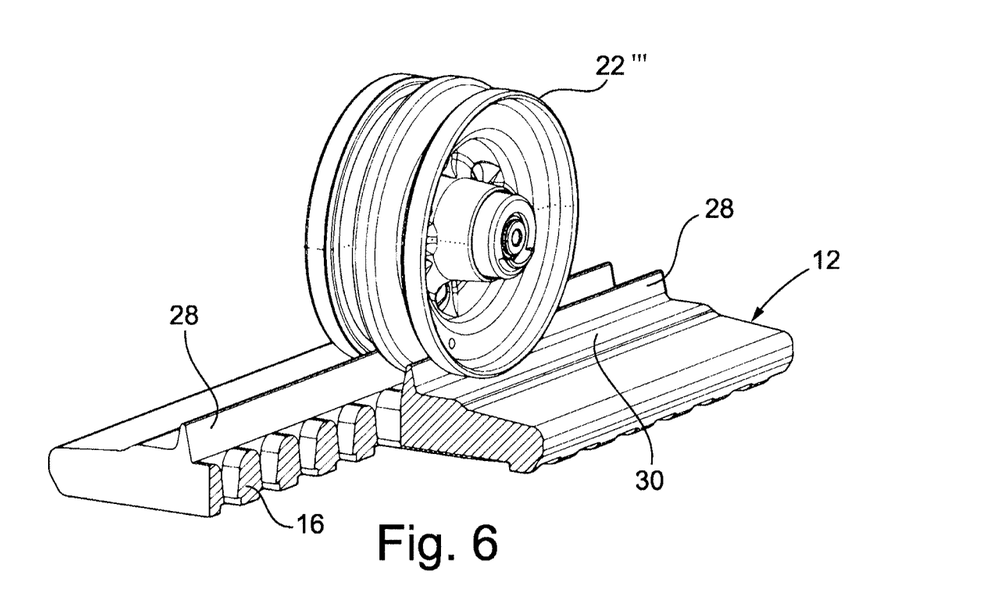
FIG. 6 is a perspective view, in partial section, of a third embodiment of an idler wheel of an undercarriage assembly for a track-type vehicle.

With reference to FIG. 6, at least one of the idler wheels 22 wheels 22''' can finally be of the triple-flange type, in other words consisting of three parallel and integral disks, between which two annular grooves are interposed. The central disk is configured for rotating in the longitudinal channel 26, whereas the two peripheral disks are configured for rotating on the respective longitudinal tracks 30 arranged on the two outer sides with respect to such a longitudinal channel 26.

Figure 7:
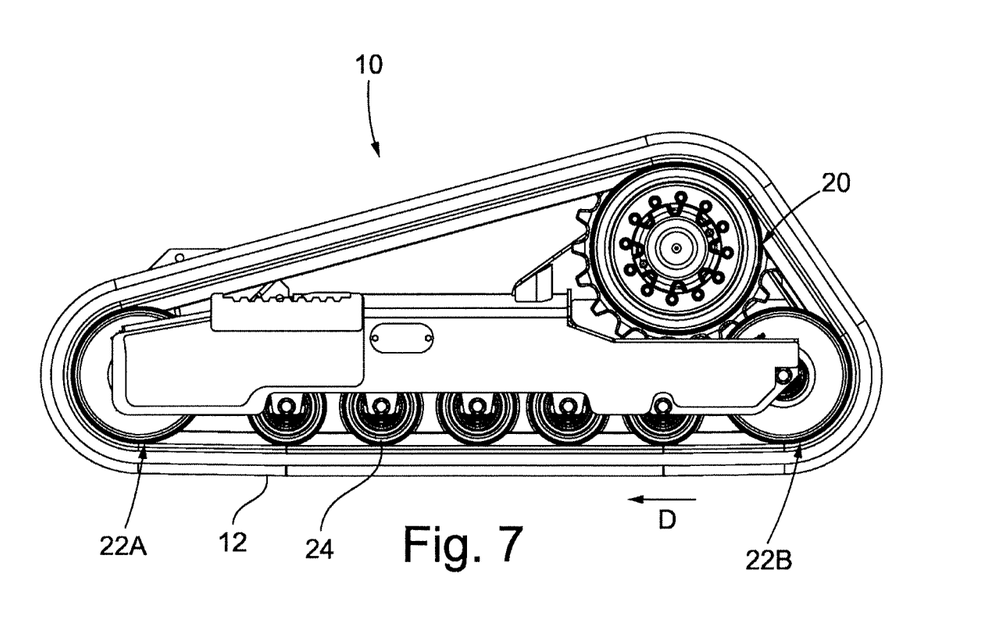
FIG. 7 is a side elevation view of an undercarriage assembly for a track-type vehicle according to the present invention.
Figure 8:
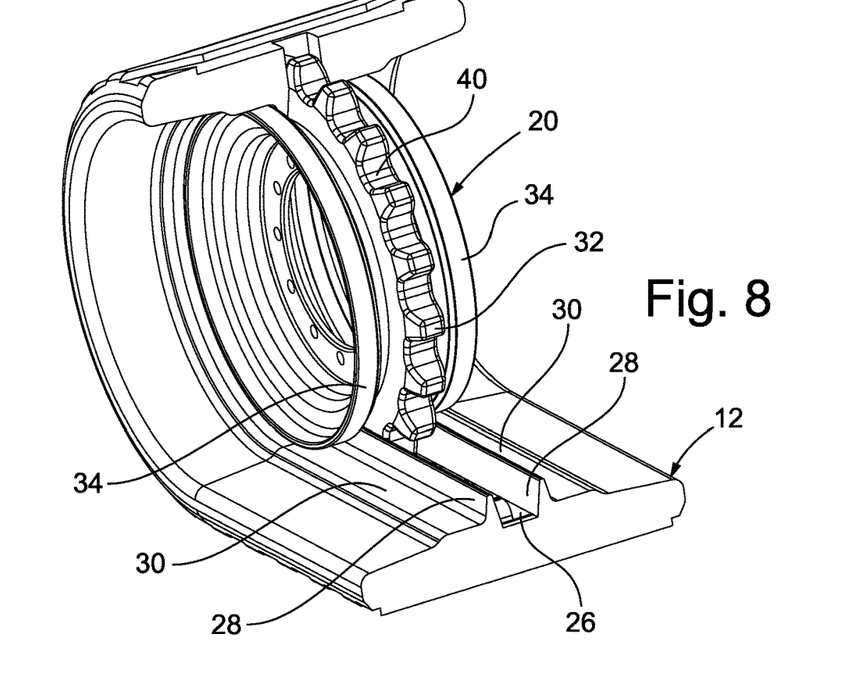
FIG. 8 is a perspective view of a drive sprocket of the undercarriage assembly of FIG. 7.
Figure 9:
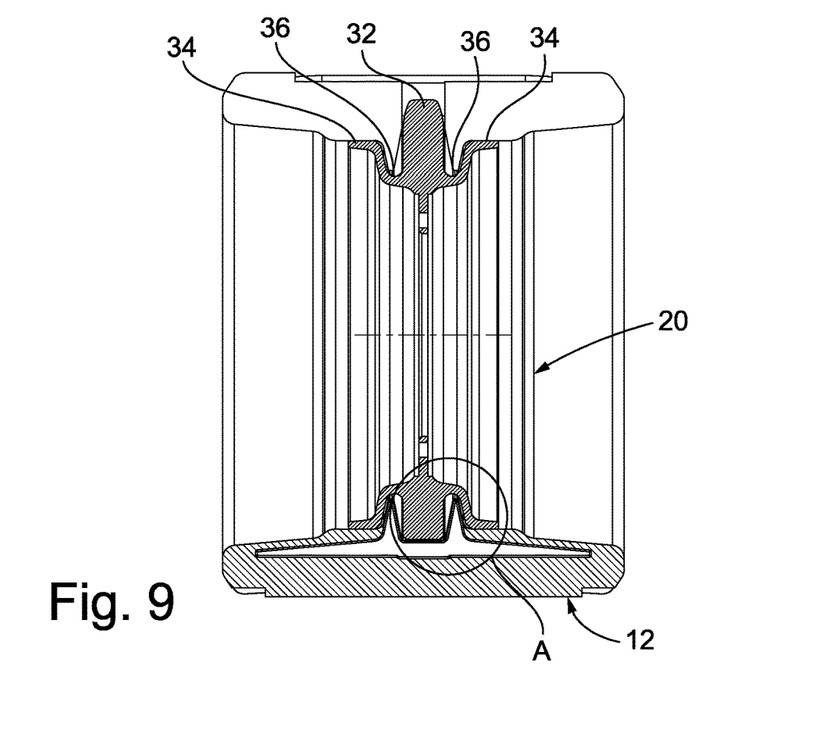
FIG. 9 is a cross section view of the drive sprocket of FIG. 8.

With reference to FIG. 7, an undercarriage assembly 10 according to the present invention is shown. In such an undercarriage assembly 10 each drive sprocket 20, shown in FIGS. 8 and 9, consists of a gear 32 integral with at least one disk 34 arranged on a plane parallel to the development plane of the gear 32 itself. Between the gear 32 and each disk 34 an annular groove 36 is interposed. Each disk 34 is provided with a smooth circumferential surface that engages with a predefined portion of the inner surface of the rubber belt 12, so as to absorb one part of the contacting forces that are generated between such a rubber belt 12 and the entire plurality of rolling elements of such a rubber belt 12.

Figure 3:
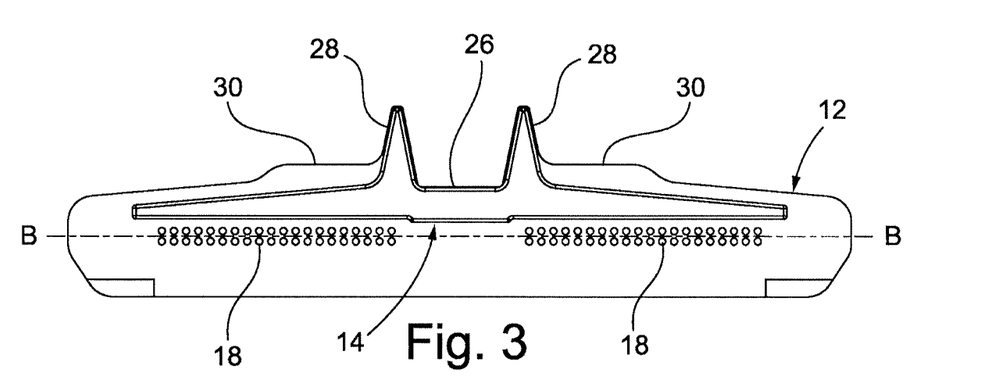
FIG. 3 is a cross section view of the rubber belt of FIG. 2.

Preferably, as shown in FIGS. 8 to 14, the gear 32 is made integral with a pair of disks 34 arranged on the two opposite surfaces of the gear 32 itself. The drive sprocket 20 thus integrates, in a single component, both the function of a drive sprocket (gear 32) for the rubber belt 12, and the function of a dual-flange idler wheel (disks 34). The two disks 34 are indeed configured to rotate on the respective two longitudinal tracks 30 arranged on the outer sides of the longitudinal channel 26 obtained on the inner surface of the rubber belt 12 (FIG. 8), whereas the respective annular grooves 36 surround the two walls 28 without there being mutual contact. Again preferably, with reference to a support plane of the vehicle or to a longitudinal midplane B-B of the rubber belt 12 (FIG. 3), the longitudinal channel 26 is arranged at a different height with respect to the height of the two longitudinal tracks 30 arranged on the outer sides of such a longitudinal channel 26.

Also for the drive sprocket 20 of the undercarriage assembly 10 according to the present invention a pitch diameter is defined like in the driving wheels according to the prior art. The pitch diameter is calculated as a function of the pitch of the rubber belt 12 and the number of teeth (Z) of the gear 32.

Figure 10:
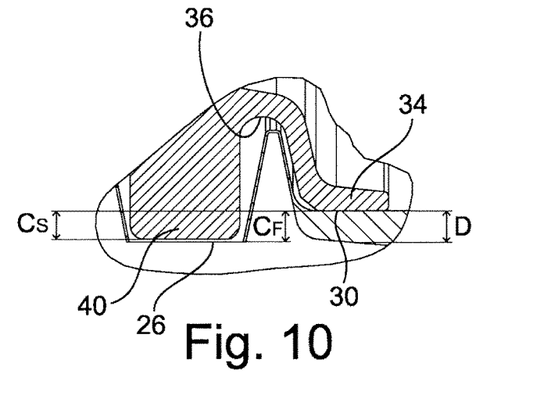
FIG. 10 is a detailed view of the detail indicated with A in FIG. 9.
Figure 11:
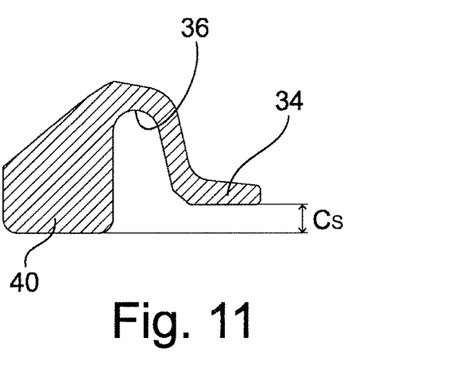
FIG. 11 is another detailed view of the annular groove of the drive sprocket of the undercarriage assembly of a track-type vehicle of FIG. 7.

Preferably, once the pitch diameter of the drive sprocket 20, which coincides with the pitch diameter of the respective gear 32, has been defined, the corresponding diameter of each disk 34 is defined in the following manner, with reference to FIGS. 10 and 11. The value $C_S$ of the projection of each tooth space 40, in other words the space between pairs of contiguous teeth of the gear 32, with respect to the circumferential edge of each disk 34, in which such a value $C_S$ is defined as the difference between the root radius of the gear 32 and the radius of each disk 34 integral with it, is kept lower than, or at most equal to the value $C_F$ of the difference in height present on the rubber belt 12, in which such a value $C_F$ is defined as the difference in height between the longitudinal channel 26 and each longitudinal track 30 arranged on an outer side of such a longitudinal channel 26. In other words, with reference to the symbols of FIG. 10:

$$C_S \leq C_F.$$

Of course, in the case in which a rubber belt 12 is used with longitudinal tracks 30 arranged lower down with respect to the longitudinal channel 26, the relationship would invert to $C_S \geq C_F$.

In this way, the pitch diameter, and thus also the relative root diameter, of the drive sprocket 20 carries a further correction with respect to the design of the driving wheels according to the prior art. In addition, the fact that the pretensioning of the rubber belt 12 is discharged over an area of the rubber belt 12 itself in which there is a layer of rubber having average thickness D, substantially equal to the value of the difference in height $C_F$, adds the benefit of being able to use the damping effect of the rubber belt 12 with respect to assemblies according to the prior art, in which the thickness of rubber in the longitudinal channel 26 intended for meshing is practically absent, since the metal insert goes into direct contact with the toothed profile of the drive sprocket.

With this sizing of the drive sprocket 20 it is thus intended to divide the two functions of the driving wheels and of the idler wheels of a conventional undercarriage assembly. In other words, the two side disks 34 work together to sustain the pretensioning of the rubber belt 12, whereas the toothing of the gear 32 performs the task of transmitting the torque of the reducer without being aggravated by the pretensioning force.

Figure 12:
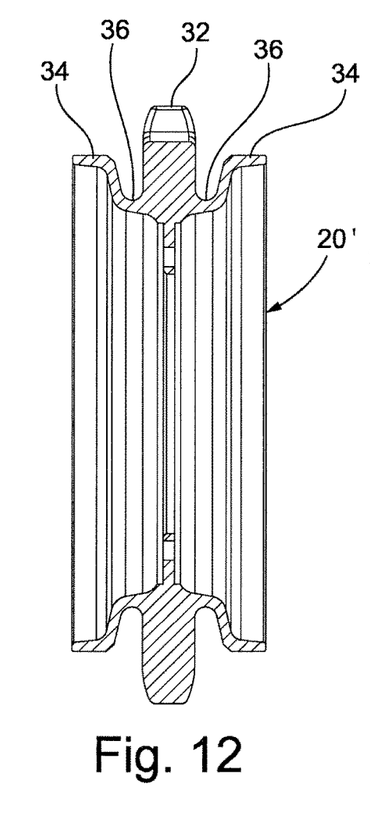
FIGS. 12, 13 and 14 respectively show a first, a second and a third embodiment of the drive sprocket of FIG. 8.
Figure 13:
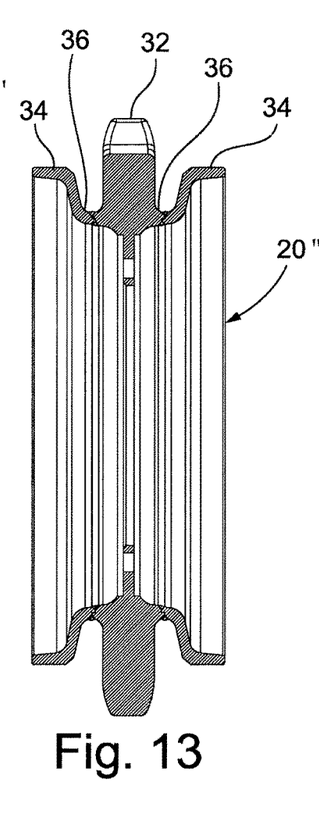
Figure 14:
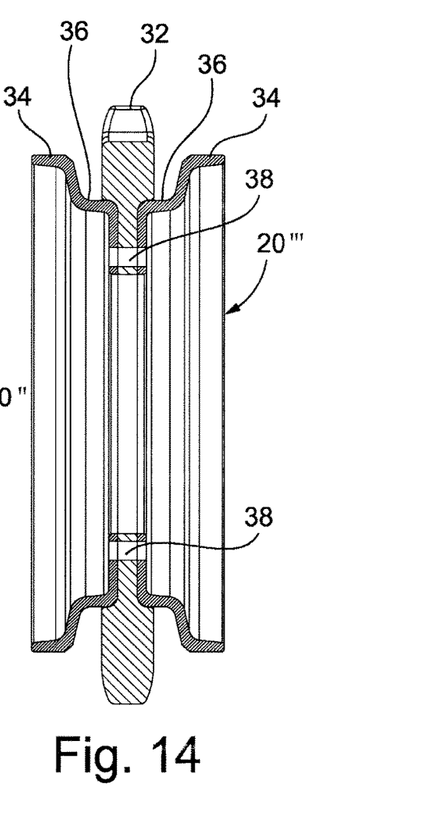

With reference to FIGS. 12 to 14, the integral coupling between the gear 32 and the respective disks 34 can be carried out using any known technology. For example, as shown in FIG. 12, the gear 32 and the respective disks 34 of drive sprockets 20' can be casted as an enbioc of metal material. As shown in FIG. 13, the disks 34 of drive sprockets 20'' can be welded on the two opposite side surfaces of the gear 32, at the respective annular grooves 36. Finally, as shown in FIG. 14, the disks 34 of drive sprockets 20''' can be screwed onto the two opposite side surfaces of the gear 32 through a plurality of bolts 38. However, this does not rule out other ways of coupling between the gear 32 and the respective disks 34 without for this reason departing from the scope of protection of the present invention.

It has thus been seen that the drive sprocket for the rubber belt of a track-type vehicle according to the present invention achieves the purposes highlighted earlier. The integration in a single component of the functions of an idler wheel and of a drive sprocket makes it possible to divide the pretensioning of the rubber belt between the toothing of the drive sprocket and the respective side flanges. The central (driving) part of the wheel mainly has the task of transmitting the drive torque to the metal insert of the rubber belt, alleviating the stress on each single tooth engaged during meshing. This configuration thus solves both the problems linked to wearing, and the problems linked to the reduction of noise and the level of vibrations of the vehicle.

The drive sprocket for the rubber belt of a track-type vehicle of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. An undercarriage assembly for a track-type vehicle, the assembly comprising:
   at least a closed-ring rubber belt, internally provided with a continuous insert made of a plurality of metal elements embedded in the rubber mass forming the rubber belt, said metal elements being spaced apart by a fixed and predetermined distance from one another, said distance determining the pitch of the rubber belt, said rubber belt further enclosing therein one or more reinforcing elements, each comprising a metal wire bundle oriented according to an axis substantially parallel to the longitudinal development central axis of the rubber belt; and
   a plurality of rolling elements of each rubber belt, comprising at least one drive sprocket, configured to mesh with the metal elements of the continuous insert and to rotationally move the respective rubber belt, of at least one idler wheel and of a plurality of rollers,
   wherein each drive sprocket comprises a gear integral with at least one disk arranged on a plane which is parallel to the development plane of said gear, an annular groove being interposed between the gear and each disk, wherein each disk is provided with a smooth circumferential surface which engages with a predefined portion of the inner surface of the rubber belt, so as to absorb one part of the contacting forces generating between said rubber belt and the entire plurality of rolling elements of said rubber belt,
   wherein the longitudinal channel is arranged at a different height, with reference to a longitudinal midplane of the rubber belt, with respect to the height of the two longitudinal tracks arranged on the outer sides of said longitudinal channel, and
   wherein the value of the projection of each tooth space, with respect to the circumferential edge of each disk, wherein said projection value is defined as the difference between the root radius of the gear and the radius of each disk being integral therewith, is lower or equal to the value of the difference in height on the rubber belt, wherein said difference value is defined as the difference in height between the longitudinal channel and each longitudinal track arranged on an outer side of said longitudinal channel.

2. The undercarriage assembly according to claim 1, wherein on the inner surface of each rubber belt are obtained:
   a longitudinal channel, delimited by a pair of walls, the metal elements of the continuous insert with which the drive sprocket meshes being also obtained within the longitudinal channel; and
   a pair of longitudinal tracks parallel with respect to the longitudinal channel and arranged outside the walls,
   wherein the gear is made integral with a pair of disks arranged on the two opposite surfaces of said gear, said two disks being configured for rotating on the respective two longitudinal tracks arranged on the outer sides of the longitudinal channel, whereas the respective annular grooves surround the two walls without being in mutual contact.

3. The undercarriage assembly according to claim 2, wherein at least one of the idler wheels is of the single flange type.

4. The undercarriage assembly according to claim 2, wherein at least one of the idler wheels is of the double flange type between which an annular groove is interposed, wherein each of the two disks is configured for rotating on a respective longitudinal track.

5. The undercarriage assembly according to claim 2, wherein at least one of the idler wheels is of the triple flange type, between which two annular grooves are interposed, wherein the central disk is configured for rotating inside the longitudinal channel, whereas the two peripheral disks are configured for rotating on the respective longitudinal tracks.

6. The undercarriage assembly according to claim 2, wherein at least one of the idler wheels comprises a single disk configured for rotating inside the longitudinal channel.

7. The undercarriage assembly according to claim 2, wherein at least one of the idler wheels comprises a pair of parallel and integral disks, between which an annular groove is interposed, wherein each of the two disks is configured for rotating on a respective longitudinal track.

8. The undercarriage assembly according to claim 2, wherein at least one of the idler wheels comprises three parallel and integral disks, between which two annular grooves are interposed, wherein the central disk is configured for rotating inside the longitudinal channel, whereas the two peripheral disks are configured for rotating on the respective longitudinal tracks.

9. The undercarriage assembly according to claim 2, wherein the gear and said at least one disk are casted as an enbloc of metal material.

10. The undercarriage assembly according to claim 2, wherein said at least one disk is welded on a respective side surface of the gear, at the annular groove.

11. The undercarriage assembly according to claim 1, wherein the gear and said at least one disk are casted as an enbloc of metal material.

12. The undercarriage assembly according to claim 1, wherein said at least one disk is welded on a respective side surface of the gear, at the annular groove.

13. The undercarriage assembly according to claim 1, wherein said at least one disk is screwed on a respective side surface of the gear by a plurality of bolts.

14. An undercarriage assembly for a track-type vehicle, the assembly comprising:
   at least a closed-ring rubber belt, internally provided with a continuous insert made of a plurality of metal elements embedded in the rubber mass forming the rubber belt, said metal elements being spaced apart by a fixed and predetermined distance from one another, said distance determining the pitch of the rubber belt, said rubber belt further enclosing therein one or more reinforcing elements, each comprising a metal wire bundle oriented according to an axis substantially parallel to the longitudinal development central axis of the rubber belt; and
   a plurality of rolling elements of each rubber belt, comprising at least one drive sprocket, configured to mesh with the metal elements of the continuous insert and to rotationally move the respective rubber belt, of at least one idler wheel and of a plurality of rollers,
   wherein each drive sprocket comprises a gear integral with at least one disk arranged on a plane which is parallel to the development plane of said gear, an annular groove being interposed between the gear and each disk, wherein each disk is provided with a smooth circumferential surface which engages with a predefined portion of the inner surface of the rubber belt, so as to absorb one part of the contacting forces generating between said rubber belt and the entire plurality of rolling elements of said rubber belt, wherein the longitudinal channel is arranged at a different height, with reference to a longitudinal midplane of the rubber belt, with respect to the height of the two longitudinal tracks arranged on the outer sides of said longitudinal channel, and wherein the value of the projection of the space interposed between pairs of contiguous teeth of the gear with respect to the circumferential edge of each disk, wherein said projection value is defined as the difference between the root radius of the gear and the radius of each disk being integral therewith, is lower or equal to the value of the difference in height on the rubber belt, wherein said difference value is defined as the difference in height between the longitudinal channel and each longitudinal track arranged on an outer side of said longitudinal channel.

* * * * *